(12) United States Patent
Rodrigue et al.

(10) Patent No.: US 12,448,119 B2
(45) Date of Patent: Oct. 21, 2025

(54) SINGLE BOOST HYDRAULIC CONTROL SYSTEM WITH MAGNETORHEOLOGICAL ACTUATOR

(71) Applicant: Textron Innovations Inc., Providence, RI (US)

(72) Inventors: Simon Rodrigue, Lorraine (CA); Carlos Alexander Fenny, Fort Worth, TX (US); Pasquale Spina, Laval (CA)

(73) Assignee: Textron Innovations Inc., Providence, RI (US)

( * ) Notice: Subject to any disclaimer, the term of this patent is extended or adjusted under 35 U.S.C. 154(b) by 452 days.

(21) Appl. No.: 18/193,840

(22) Filed: Mar. 31, 2023

(65) Prior Publication Data

US 2024/0326993 A1  Oct. 3, 2024

(51) Int. Cl.
*B64C 27/00* (2006.01)
*B64C 27/12* (2006.01)
*F15B 19/00* (2006.01)
*G05D 17/02* (2006.01)

(52) U.S. Cl.
CPC .......... *B64C 27/12* (2013.01); *F15B 19/005* (2013.01); *G05D 17/02* (2013.01)

(58) Field of Classification Search
CPC ....... B64C 27/12; B64C 27/64; F15B 19/005; G05D 17/02
See application file for complete search history.

(56) References Cited

U.S. PATENT DOCUMENTS

| | | |
|---|---|---|
| 7,890,222 B1 | 2/2011 | Shultz et al. |
| 9,656,746 B2 | 5/2017 | Latham et al. |
| 9,815,553 B2 | 11/2017 | McCollough et al. |
| 10,239,610 B2 | 3/2019 | Fenny et al. |
| 10,570,936 B2 | 2/2020 | Hussey |
| 2014/0234102 A1* | 8/2014 | Fenny .................... B64C 27/64 416/171 |

OTHER PUBLICATIONS

Operational Evaluation Board Report, European Aviation Safety Agency, Bell Helicopter, Bell 429, May 7, 2012, 21 pages.

\* cited by examiner

*Primary Examiner* — Ian Jen
(74) *Attorney, Agent, or Firm* — Akona IP PC (57) ABSTRACT

One embodiment is an aircraft comprising a fuselage; a rotor system connected to the fuselage and comprising at least one rotor blade; a pilot input device; a single hydraulic servo actuator in mechanical communication with the pilot input device and the rotor system for providing force assistance in connection with the pilot input device; and a magnetorheological (MR) actuator in mechanical communication with the pilot input device and the rotor system for providing auto pilot assistance in connection with the pilot input device; wherein subsequent to detection of a failure of the single hydraulic servo actuator, the MR actuator is caused to provide force assistance to the pilot input device.

20 Claims, 11 Drawing Sheets

SINGLE BOOST HYDRAULIC CONTROL SYSTEM WITH MAGNETORHEOLOGICAL ACTUATOR

TECHNICAL FIELD

This disclosure relates in general to the field of aircraft and, more particularly, though not exclusively, to a single boost hydraulic control system with magnetorheological actuator for an aircraft.

BACKGROUND

Certain rotorcraft, such as helicopters, may include one or more rotor systems. On example of a rotorcraft rotor system is a main rotor system. A main rotor system may generate aerodynamic lift to support to the weight of the rotorcraft in flight and thrust to counteract aerodynamic drag and more the aircraft in forward flight. Another example of a rotorcraft rotor system is a tail rotor system. A tail rotor system may provide anti-torque and/or directional control for the rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 1A:
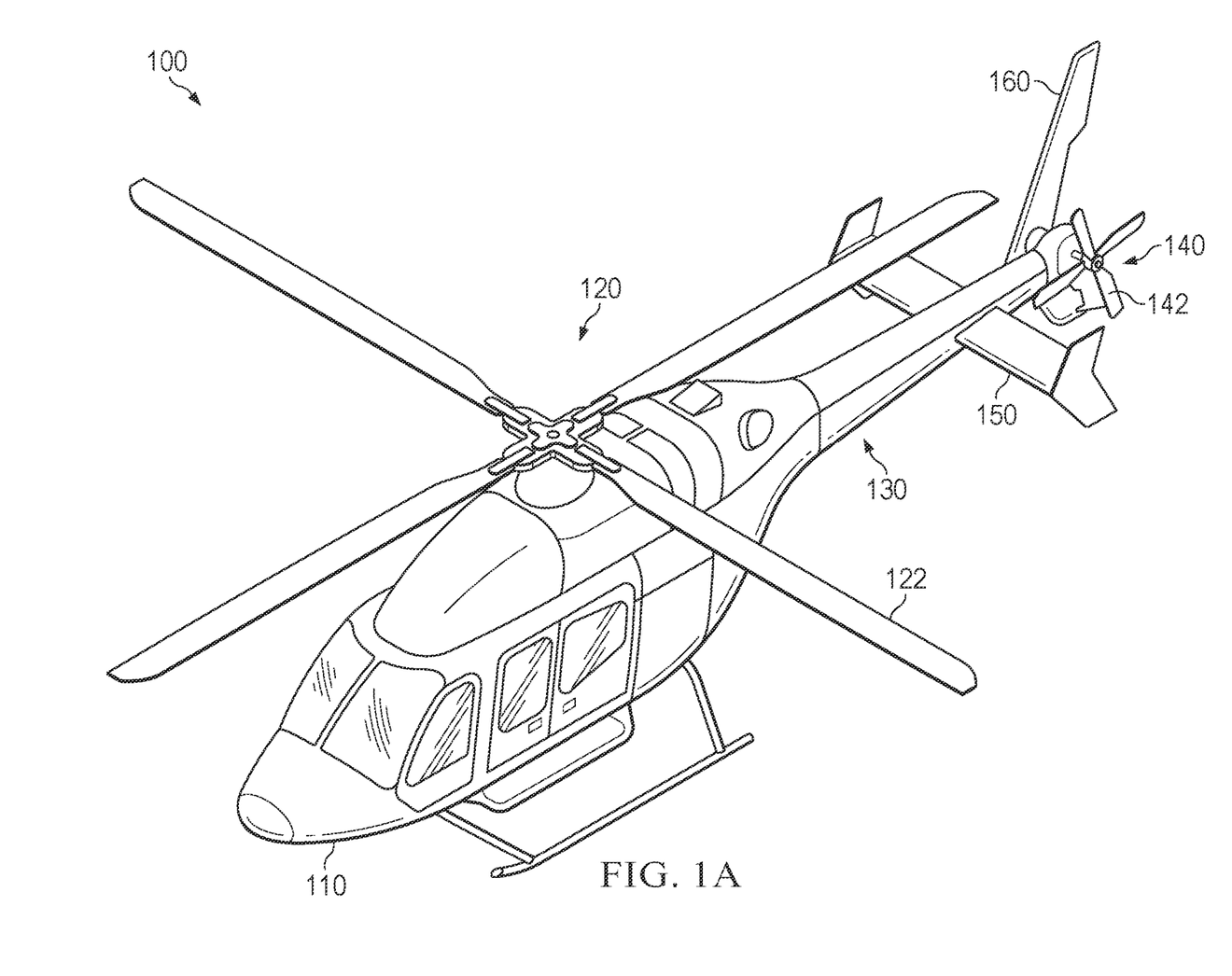
FIGS. 1A-1B illustrate an example rotorcraft in which embodiments described herein may be implemented.
Figure 1B:
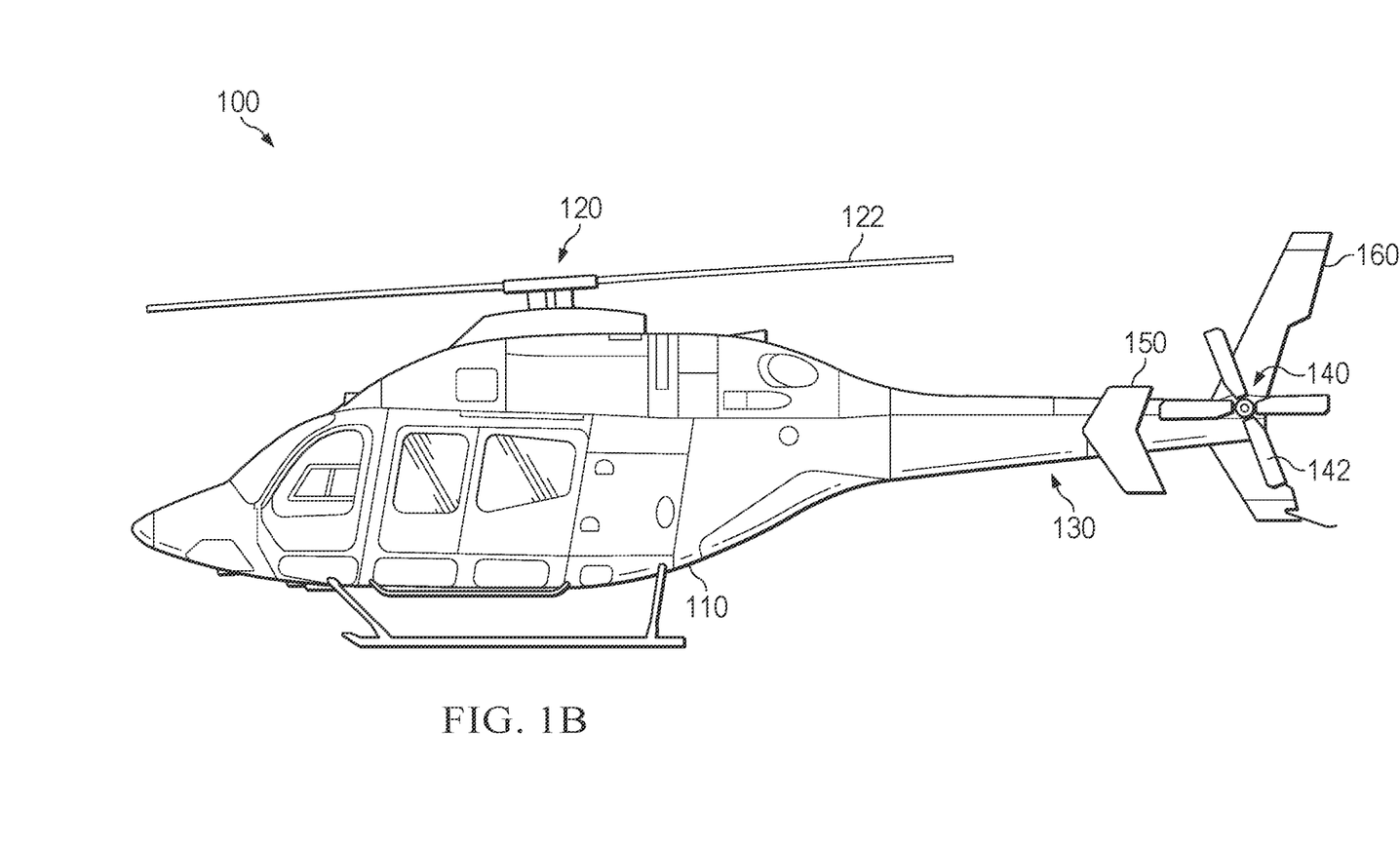

FIGS. 1A-1B illustrate various views of an example embodiment of a rotorcraft 100. Rotorcraft 100 includes a fuselage 110, a rotor system (also alternatively referred to as a main rotor system) 120, and an empennage 130. The fuselage 110 is the main body of the rotorcraft, which may include a cabin for the crew, passengers, and/or cargo, and may also house certain mechanical and electrical components, such as one or more engines, transmission systems, and flight controls. The rotor system 120 is used to generate lift for the rotorcraft using a plurality of rotating rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control for the rotorcraft 100 using a plurality of rotating rotor blades 142.

For example, torque generated by the engine(s) causes the rotor blades 142 to rotate, which in turn provides anti-torque and/or directional control. Blades 142 may provide thrust in the same direction as the rotation of blades 122 so as to counter the torque effect created by rotor system 120 and blades 122. Teachings of certain embodiments recognize that blades 142 may represent one example of a secondary rotor system. Other examples may include, but are not limited to, forward-thrust propellers (e.g., pusher propellers, tractor propellers, etc.), tail anti-torque propellers, ducted rotors, and ducted and mounted inside and/or outside the rotorcraft 100.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape, and may also include one or more movable control surfaces. The primary purpose of a stabilizer is to improve stability about a particular axis (e.g., pitch or yaw stability), although a stabilizer can also provide other secondary aerodynamic benefits.

A horizontal stabilizer (e.g., horizontal stabilizer 150) is primarily used to provide stability in pitch, or longitudinal stability. For example, both the rotor and fuselage of a rotorcraft typically have an inherent negative stability derivative in pitch, and accordingly, a horizontal stabilizer may be used to neutralize pitch instability and improve the overall handling qualities of the rotorcraft. A horizontal stabilizer may also be used to generate lift for a rotorcraft, for example, to aid in climb or ascent. In some cases, a horizontal stabilizer may also include one or more movable control surfaces, such as an adjustable slat to aid in generating lift. The design of a horizontal stabilizer (e.g., airfoil shape, size, position on a rotorcraft, control surfaces) implicates numerous performance considerations and is often an extremely challenging aspect of aircraft design.

A vertical stabilizer (e.g., vertical stabilizer 160) is primarily used to provide stability in yaw, or directional stability. Although considerable yaw stability and control is often provided by a tail rotor, a vertical stabilizer may be used to supplement the performance of the tail rotor and/or reduce the performance requirements of the tail rotor. Accordingly, designing a vertical stabilizer and a tail rotor often implicates numerous interrelated performance considerations, particularly due to the interaction between their respective airflows. For example, a smaller vertical stabilizer may reduce the adverse effects on tail rotor efficiency, but may adversely impact yaw stability and other design requirements (e.g., sideward flight performance, internal capacity for housing components within the vertical stabilizer). Accordingly, various performance considerations must be carefully balanced when designing a vertical stabilizer.

It will be recognized that various embodiments of horizontal and vertical stabilizers with designs that balance a variety of performance considerations to provide optimal performance may be provided. For example, certain embodiments of a horizontal stabilizer may be designed to provide strong aerodynamic performance (e.g., pitch stability and/or generating sufficient lift during climb or ascent) without using slats. Such a horizontal stabilizer may use a tailored airfoil design that is cambered and may form a concave slope on the top surface and/or a convex slope on the bottom surface. In some embodiments, the horizontal stabilizer may be mounted on the aft end of a rotorcraft. By obviating the need for slats, such a horizontal stabilizer design reduces complexity without a performance penalty, thus resulting in a more cost-efficient and reliable solution. Moreover, eliminating the slats similarly eliminates the need to provide anti-icing for the slats, thus providing a further reduction in complexity.

Moreover, certain embodiments of a vertical stabilizer may be designed to provide strong aerodynamic performance. Such a vertical stabilizer may use a tailored airfoil design that satisfies various design criteria, including strong aerodynamic performance (e.g., yaw stability, anti-torque control, minimal flow separation and drag). In some embodiments, for example, the vertical stabilizer may have a cambered airfoil shape that provides the requisite yaw stability and anti-torque control while also minimizing flow separation and drag. The cambered airfoil shape, for example, may enable the vertical stabilizer to provide a portion of the anti-torque required in forward flight (e.g., reducing the anti-torque requirements and power consumption of the tail rotor), and/or may also provide sufficient anti-torque to allow continued flight in the event of a tail rotor failure. The cambered airfoil shape may also enable the vertical stabilizer to provide sufficient aerodynamic sideforce to offset the tail rotor thrust in forward flight, thus minimizing tail rotor flapping and cyclic loads and maximizing the fatigue life of components. Moreover, in some embodiments, the vertical stabilizer may have a blunt trailing edge (rather than a pointed trailing edge) in order to reduce the thickness tapering on the aft end without modifying the desired chord length, thus minimizing flow separation and drag while also reducing manufacturing complexity.

It should be appreciated that rotorcraft 100 shown in FIGS. 1A and 1B is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

Teachings of certain embodiments relating to rotor systems described herein may apply to rotor system 120 and/or other rotor systems, such as tiltrotor and helicopter rotor systems. It should be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIGS. 1A and 1B. For example, rotor system 120 may include components such as a power train, drive shafts, a hub, a swatch plate, and pitch links.

In the example illustrated in FIGS. 1 and 1B, power may be provided from the engines to main rotor blades 122 and tail rotor blades 142 through a combination of drive shafts, gearboxes (e.g., transmission systems) and other components. In some example embodiments, engines provide power through a main rotor gearbox to a rotating mast in mechanical communication with rotor blades 122. In addition, a drive shaft may provide power to a secondary rotor gearbox (e.g., a 90-degree gearbox), which may transit power to rotor blades 142. In these example embodiments, main rotor gearbox may be proximate the fuselage 110, secondary rotor gearbox may be proximate the empennage 130, and drive shaft may be proximate the fuselage and/or the empennage (e.g., extending from the main rotor gearbox to secondary rotor gearbox).

A pilot may manipulate one or more pilot flight controls in order to achieve controlled aerodynamic flight of the rotorcraft 100. Inputs provided by the pilot to pilot flight controls may be transmitted mechanically and/or electronically (e.g., via a fly-by-wire flight control system) to flight control devices. Flight control devices may represent devices operative to change the flight characteristics of the aircraft. Examples of flight control devices on the rotorcraft 100 may include a control system operable to change the positions of blades 122 and/or 142.

Rotorcraft typically include three sets of pilot flight controls, including cyclic control, collective control, and pedal (for directional) control. Other pilot flight controls may include power control and thrust control. In general, cyclic pilot flight controls may allow a pilot to impart cyclic motions on blades 122 to cause the rotorcraft 100 to tilt in a direction specified by the pilot. For tilting forward and back (pitch) and/or sideways (roll), the angle of attack of blades 122 ay be altered cyclically during rotation, creating different amounts of lift at different points in the cycle.

Collective pilot flight controls may allow a pilot to impart collective motions on blades 122 to change the overall lift produced by the blades. For increasing or decreasing overall lift in blades 122, the angle of attack for all blades may be collectively altered by equal amounts at the same time, resulting in ascents, descents, acceleration and/or deceleration.

Anti-torque pilot flight controls may allow a pilot to change the amount of anti-torque force applied to the rotorcraft 100. As noted above, blades 142 may provide thrust in the same direction as the rotation of the blades 122 so as to counter the torque effect created by the rotor system 120 and blades 122. Anti-torque pilot flight controls may change the amount of anti-torque force applied so as to change the heading of rotorcraft 100. In some embodiments, anti-torque pilot flight controls may change the amount of anti-torque fore applied by changing the pitch of the blades 142, increasing or reducing the thrust produced by the blades 142, and causing the nose of the rotorcraft to yaw in the direction of the applied pedal. In some embodiments, the rotorcraft 100 may include additional or different anti-torque devise, such as a rudder or a NOTAR anti-torque device, and the anti-torque pilot flight controls may change the amount of force provide by the additional different anti-torque devices.

Main rotor and tail rotor flight control systems, including cyclic, collective and anti-torque controls, may be used to regulate the attitude, altitude and direction of flight of rotorcraft 100. In accordance with features of embodiments described herein, the flight controls are hydraulically boosted to reduce pilot effort in controlling the airport and to counteract control feedback forces.

Figure 2:
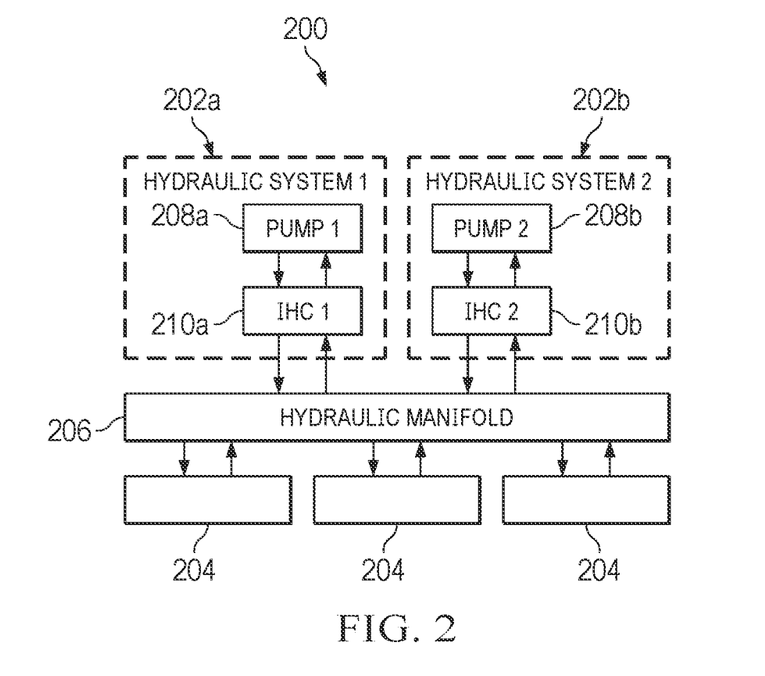
FIG. 2 illustrates an example system block diagram of a dual hydraulic system for boosting pilot flight control input in a rotorcraft.

For aircraft equipped with a single hydraulic system used for boosting pilot flight control input, one certification requirement is to be able to maintain any required flight condition and make a smooth transition from any flight condition to any other flight condition without any exceptional piloting skill, alertness, or strength for loss or failure of the hydraulic boost system. As aircraft have increased in size, dual hydraulic system actuators for boosting pilot flight control input have been implemented to meet the aforementioned safety requirements of 14 CFR 27.141 and 14 CFR 17.695. FIG. 2 is a system block diagram of a dual hydraulic system 200 for boosting pilot flight control input in a rotorcraft, such as rotorcraft 100, in order to. As shown in FIG. 2, system 200 includes two separate hydraulic systems 202a and 202b for providing dual parallel power to flight control actuators 204 (which may include actuators for cyclic and collective control of main rotor system and directional control of tail rotor system), via a hydraulic manifold 206. Each of the hydraulic systems 202a, 202b, is powered by a single transmission driven pump 208a, 208b, which supplies pressurized fluid to a respective Integrated Hydraulic Module (IHM) 210a, 210b, for filtration and distribution to the flight control actuators 204. The extra components necessitated by including two independent hydraulic systems in a rotorcraft add weight and cost and consume valuable additional space on the rotorcraft.

In particular embodiments of a rotorcraft, such as rotorcraft 100 (FIGS. 1A and 1B), an actuator may be connected to a pilot input device via an output shaft for moving the pilot input device and/or reacting to movements of the pilot input device via the output shaft. In certain embodiments, the actuator may be implemented as a magnetorheological (MR) actuator that utilizes MR fluid to provide force feedback and actively drive the pilot input device. MR fluid is a type of "smart fluid" that may comprise ferromagnetic particles dispersed in a carrier fluid, such as oil. When subjected to a magnetic field, the stress yield of the fluid may increase, potentially to the point at which the fluid becomes a viscoplastic solid. The yield stress of the fluid when in its active, or "on," state may be controlled by varying the intensity of the magnetic field to which it is subjected. Accordingly, the ability of the fluid to transmit force can be controlled by modulating current in an electromagnet.

Figure 3A:
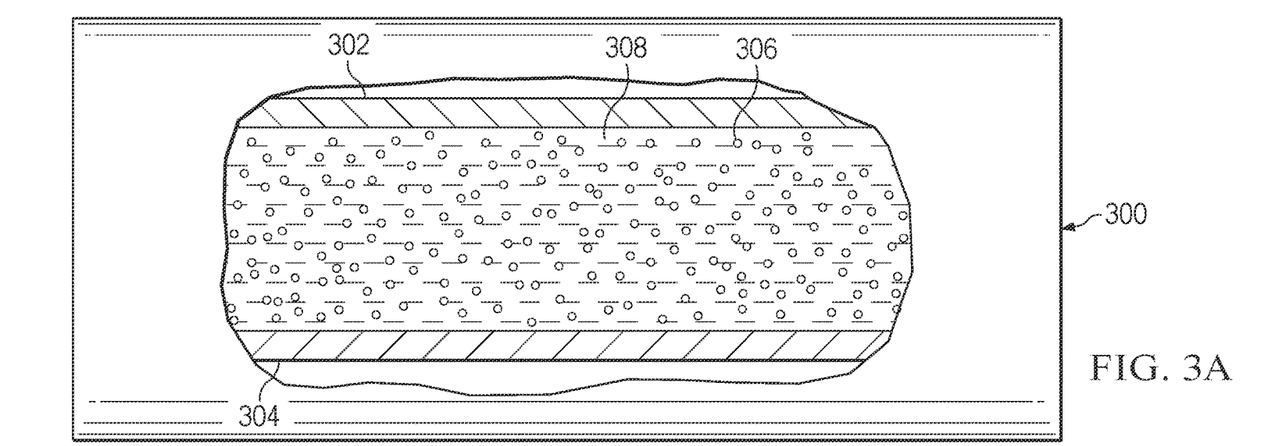
FIGS. 3A and 3B illustrate an example magnetorheological (MR) fluid device according to features of embodiments described herein.
Figure 3B:
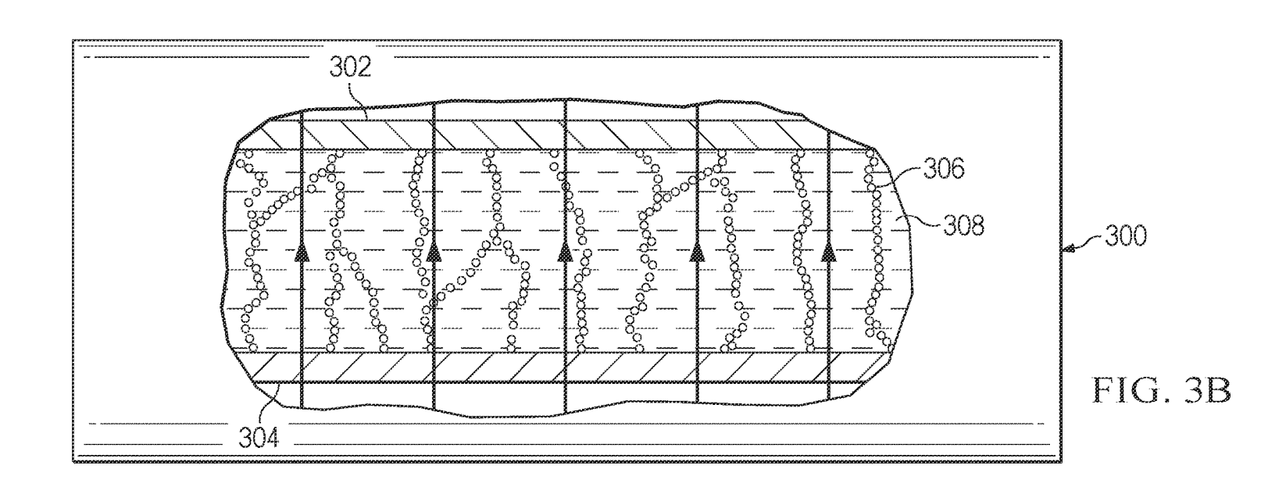

An MR fluid device may provide an output in response to an input received from an input source, such as a pilot input device or a flight control computer. FIGS. 3A and 3B illustrate a conceptual view of an MR fluid device 300 that may be used to implement an MR actuator in accordance with embodiments described herein. As shown in FIGS. 3A and 3B, MR fluid device 300 includes bodies 302 and 304 separated by an MR fluid comprising ferromagnetic particles 306 disposed in a carrier fluid 308. In the example illustrated in FIGS. 3A and 3B, body 302 may be in mechanical communication with devices associated with main rotor system 120 and/or tail rotor system 140 (FIGS. 1A and 1B).

FIG. 3A illustrates MR fluid device 300 when the MR fluid is subject to little or no magnetic flux. In contrast, FIG. 3B shows MR fluid device 300 when the MR fluid is subject to a larger magnetic flux. Accordingly, as illustrated by FIGS. 3A and 3B, movement between bodies 302 and 304 may be more restricted when MR fluid device 300 is subject to a larger magnetic flux (FIG. 3B) than when subjected to little or no magnetic flux (FIG. 3A).

Accordingly, MR fluid device 300 may vary the amount of force provided in response to a received input by changing the amount of magnetic flux to which the ferromagnetic particles 306 are subjected. In particular, MR fluid device 300 may provide an output force based on the input force by changing the amount of magnetic flux based on the input force. In addition, MR fluid device 300 may be less prone to component failures than some other actuators because ferromagnetic particles 306 and carrier fluid 308 may prevent at least some friction between bodies 302 and 304. For example, MR fluid device 300 may prevent metal-to-metal contact between sliding bodies, thereby preventing heat spots and concentrated wear that can lead to mechanical seizure (e.g., binding) due to such metal-to-metal contact.

Figure 4A:
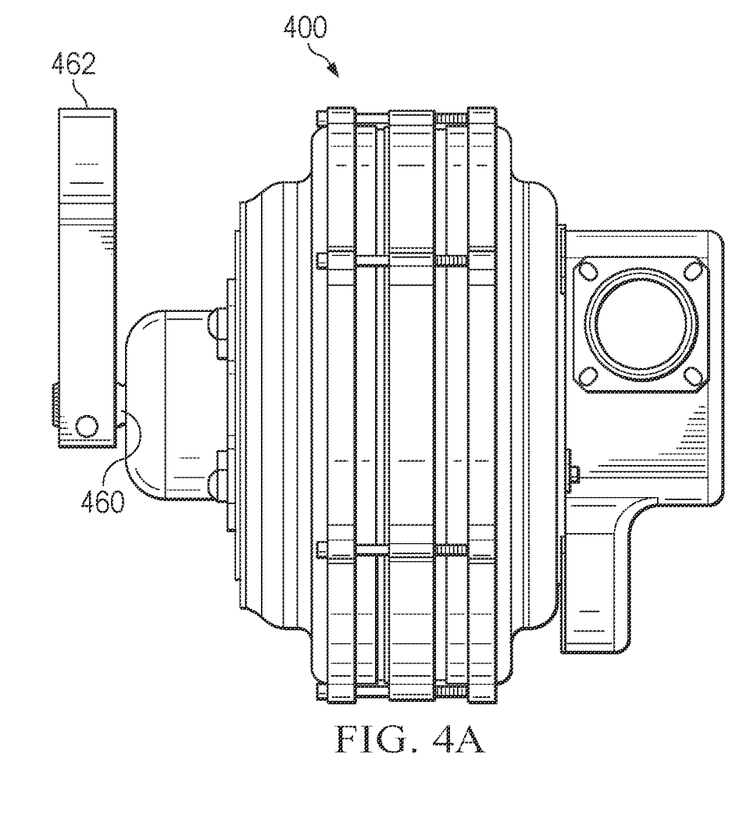
FIGS. 4A-4F illustrate various views of an example actuator implemented as an MR fluid device according to features of embodiments described herein.
Figure 4B:
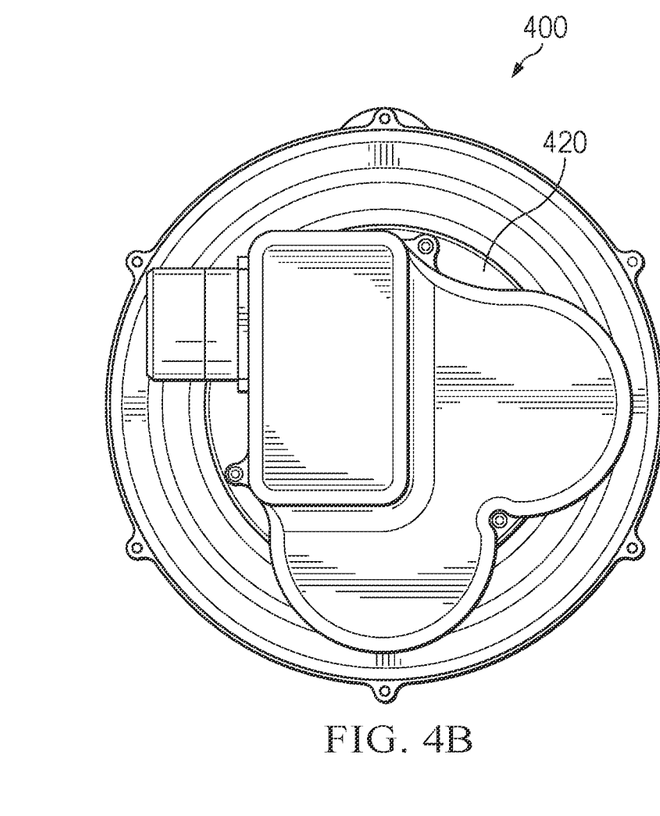
Figure 4C:
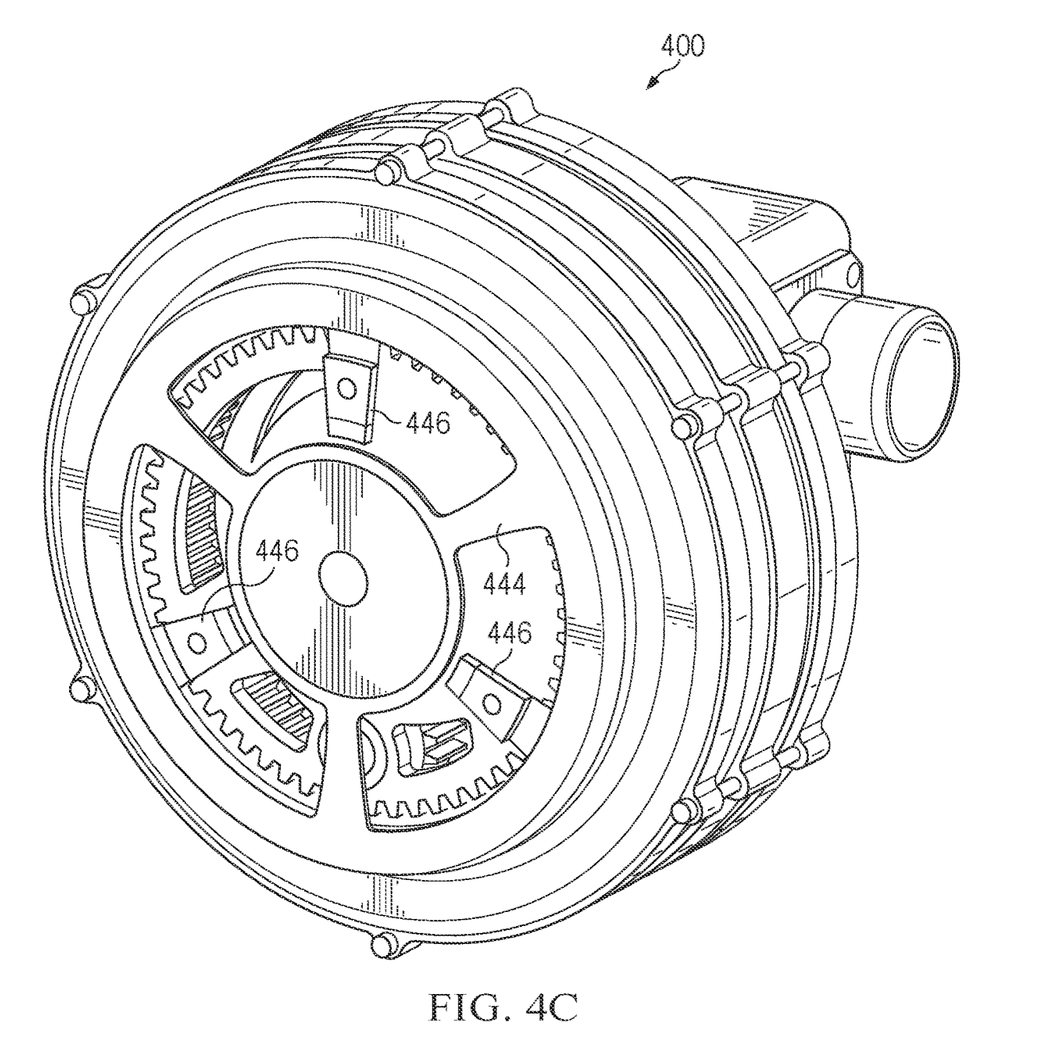
Figure 4D:
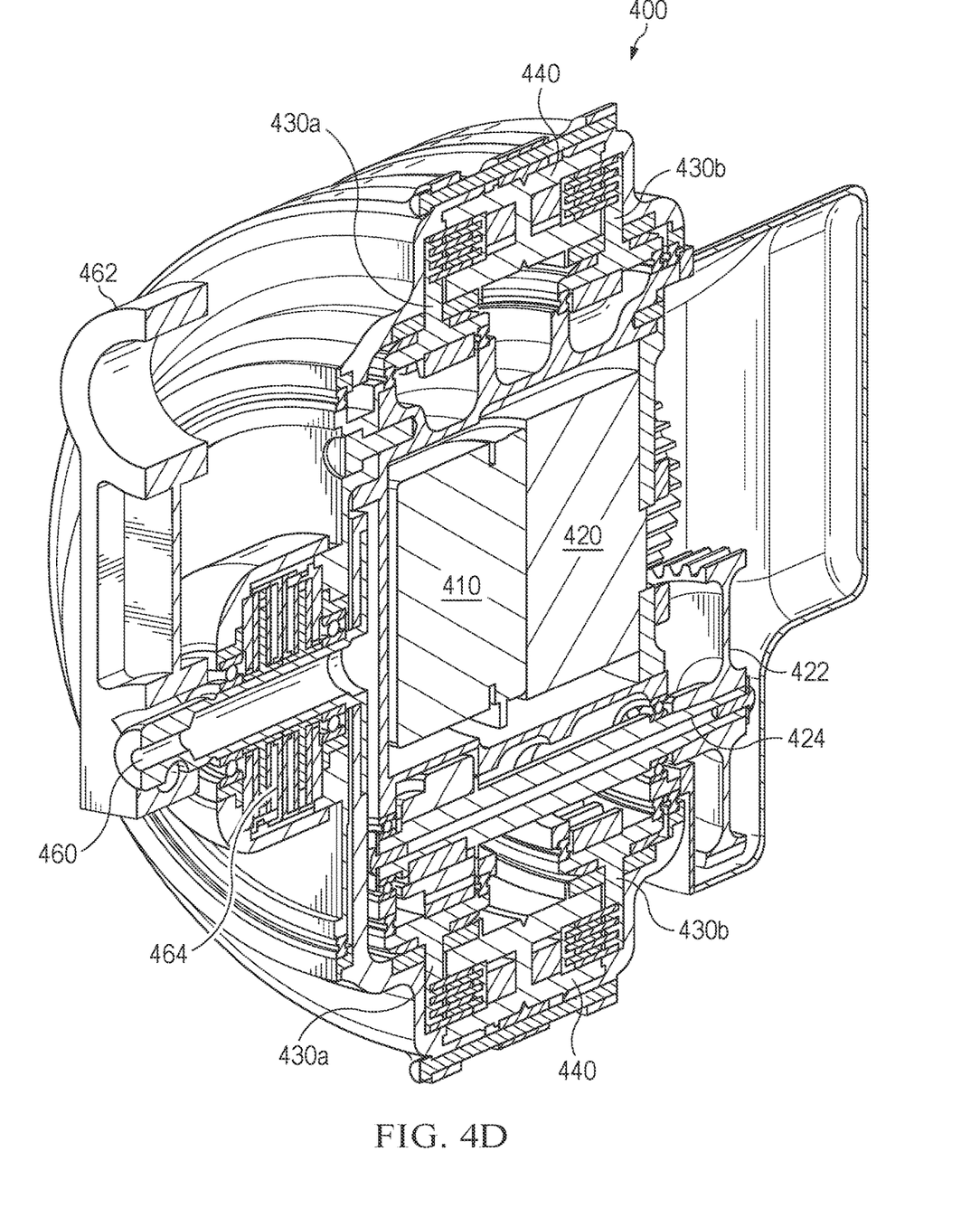
Figure 4E:
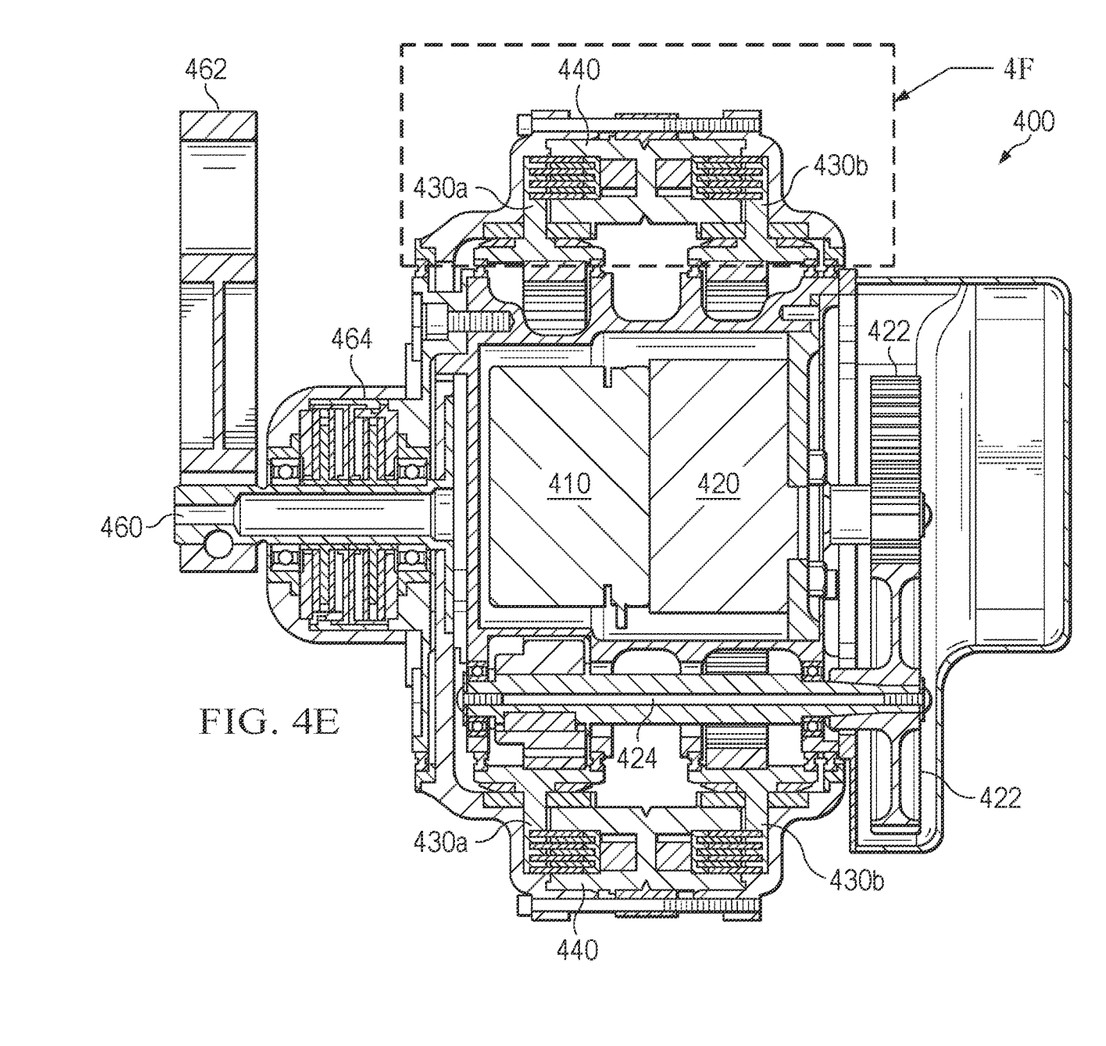
Figure 4F:
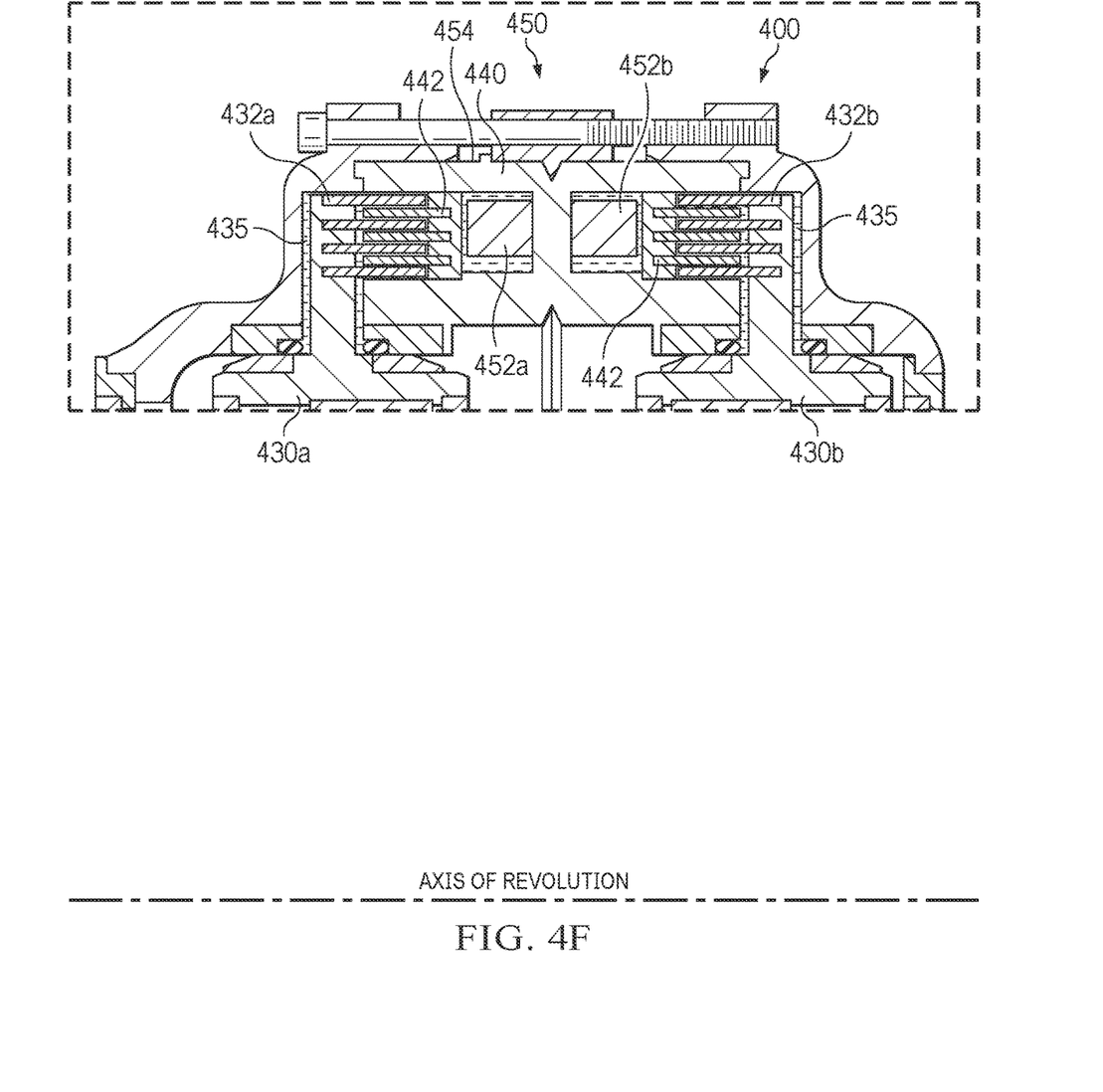

Referring now to FIGS. 4A-4F, in accordance with features of embodiments described herein, an MR actuator 400 comprising an MR fluid device similar to MR fluid device 300 (FIGS. 3A and 3B), may provide an output force by applying a working force to the output body using MR fluid. FIG. 4A illustrates a side view of MR actuator 400. FIG. 4B illustrates an end view of MR actuator 400. FIG. 4C illustrates a perspective view of MR actuator 400. FIG. 4D illustrates a perspective cross-sectional view of MR actuator 400. FIG. 4E illustrates a cross-sectional side view of the MR actuator 400 as shown in FIG. 4A. FIG. 4F illustrates a more detailed view of the cross-sectional view of the MR actuator 400 as shown in FIG. 4E. As shown in one or more of FIGS. 4A-4F, MR actuator 400 includes a power source 410, a gearbox 420, driving members 430a and 430b, a driven member 440, a magnetic field system 450, and an output shaft 460. MR fluid 435 (comprising ferromagnetic particles disposed in a carrier fluid) may be disposed between driving members 430a/430b and driven member 440. As best illustrated in FIGS. 4D and 4E, mechanical energy (torque) from power source 410 is provided to driving members 430a and 430b via gearbox 420. Reversing gears 422 are provided such that mechanical energy is supplied to driving members 430a and 430b such that driving members 430a and 430b rotate in opposite directions. Driven member 440 rotates bidirectionally in response to receiving mechanical energy from either driving member 430a or driving member 430b via MR fluid 435. Driven member 440 is in mechanical communication with output shaft 460 such that rotation of driven member 440 causes output shaft 460 to rotate output lever 462. Output lever 462 may be coupled to various mechanical components of rotorcraft 100 (FIGS. 1A and 1B), for example. Position measurement devices 344 may be provided to measure movement of output shaft 460. As best illustrated in FIG. 4C, torque may be transmitted from driven member 440 to output shaft 460 via torque member spokes 442, which may enable the fixed front plate to be fastened to the central housing, as shown in FIG. 4C. Front plate spacers 446 may be provided in connection with the fixed front plate to form integrated hard stops with the torque member spokes 444. In the illustrated embodiment, front place spacers 446 prevent torque member spokes 444 from rotating beyond a predetermined range of motion. In operation, according to one example embodiment, movement of driven member 440 may be controlled by controlling the magnetic field intensity in the MR fluid 435 using magnetic field system 450. In general, MR fluid 435 transmits at least some rotational energy (torque) to driven member 440, thereby causing driven member 440 to rotate. Magnetic field system 450 subjects MR fluid 435 to a magnetic field that, if changed, may change the viscosity (or, more particularly, the yield shear stress) of MR fluid 435. Changing the viscosity of MR fluid 435, in turn, may change the amount of rotational energy transferred from driving members 430a/430b to driven member 440. Accordingly, in this example, the amount of rotational energy transferred to driven member 440 may be regulated by controlling the amount of magnetic field generated by magnetic field system 450. Teachings of certain embodiments recognize that magnetic field system 450 may control the bidirectional movement of driven member 440 may selectively controlling the mechanical energy transmitted from driving members 430a and 430b, which may rotate in opposite directions. For example, increasing the viscosity (yield shear stress) of MR fluid 435 between driving member 430a and driven member 440 may cause driven member 440 to rotate in one direction, whereas increasing the viscosity of MR fluid 435 between driving member 430b and driven member 440 may cause driven member 440 to rotate in the opposite direction. In this way, magnetic field system 450 may control the position of driven member 440 (and thereby output shaft 460 and output lever 462) by selectively controlling the mechanical energy transmitted from driving members 430a and 430b via MR fluid 435. As best shown in FIG. 4F, magnetic field system 450 may include two coils 452a and 452b disposed adjacent to MR fluid 435. Coil 452a corresponds to driving member 430a rotating in a first direction, and coil 452b corresponds to driving member 430b rotating in a second direction opposite to the first direction. A magnetic housing 454 may be provided to guide the electromagnetic energy provided by coils 452a and 452b. In the illustrated embodiment, the MR fluid 435 may be disposed between a first set of rotor drums 432a, which may be coupled to driving member 430a, and a first set of stator drums 442, which may be coupled to driven member 440. MR fluid 435 may also be disposed between a second set of rotor drums 432b, which may be coupled to driving member 430b, and a second set of stator drums 442, which may be coupled to driven member 440. In operation, magnetic field system 450 may control the amount of rotational energy transferred from driving members 430a/430b to driven member 340 by adjusting the magnetic fields generated by coils 452a/452b, which results in a change in viscosity (yield shear stress) of the MR fluid 435 situated between rotor drums 432a/432b and stator drums 442. These magnetic fields may be adjusted, for example, by adjusting the amount of current that is fed to coil 432a/432b. In this manner, magnetic field system 450 may control the position of driven member 440 (and thereby output shaft 460 and output lever 462) by selectively controlling the mechanical energy transmitted from driving members 430a and 430b via MR fluid 435. Teachings of certain embodiments recognize the capability of magnetic field system 450 to control the position and movement of driven member 440 (and thereby output shaft 460, output lever 462, and the pilot input device) in a variety of manners.

In a particular example in which MR actuator 400 is implemented as a trim actuator, magnetic field system 450 may move the trim position of the pilot input device by changing the viscosity (yield shear stress) of the MR fluid 435 situated between rotor drums 432a/432b and stator drum 442 and causing driven member 440 to move to a new position. Magnetic field system 450 may allow MR actuator 400 to modulate the force being felt by the pilot in real time. For example, teachings of certain embodiments recognize the capability to change the amount of force felt by the pilot when the pilot moves the pilot input device away from the trim position.

Figure 5:
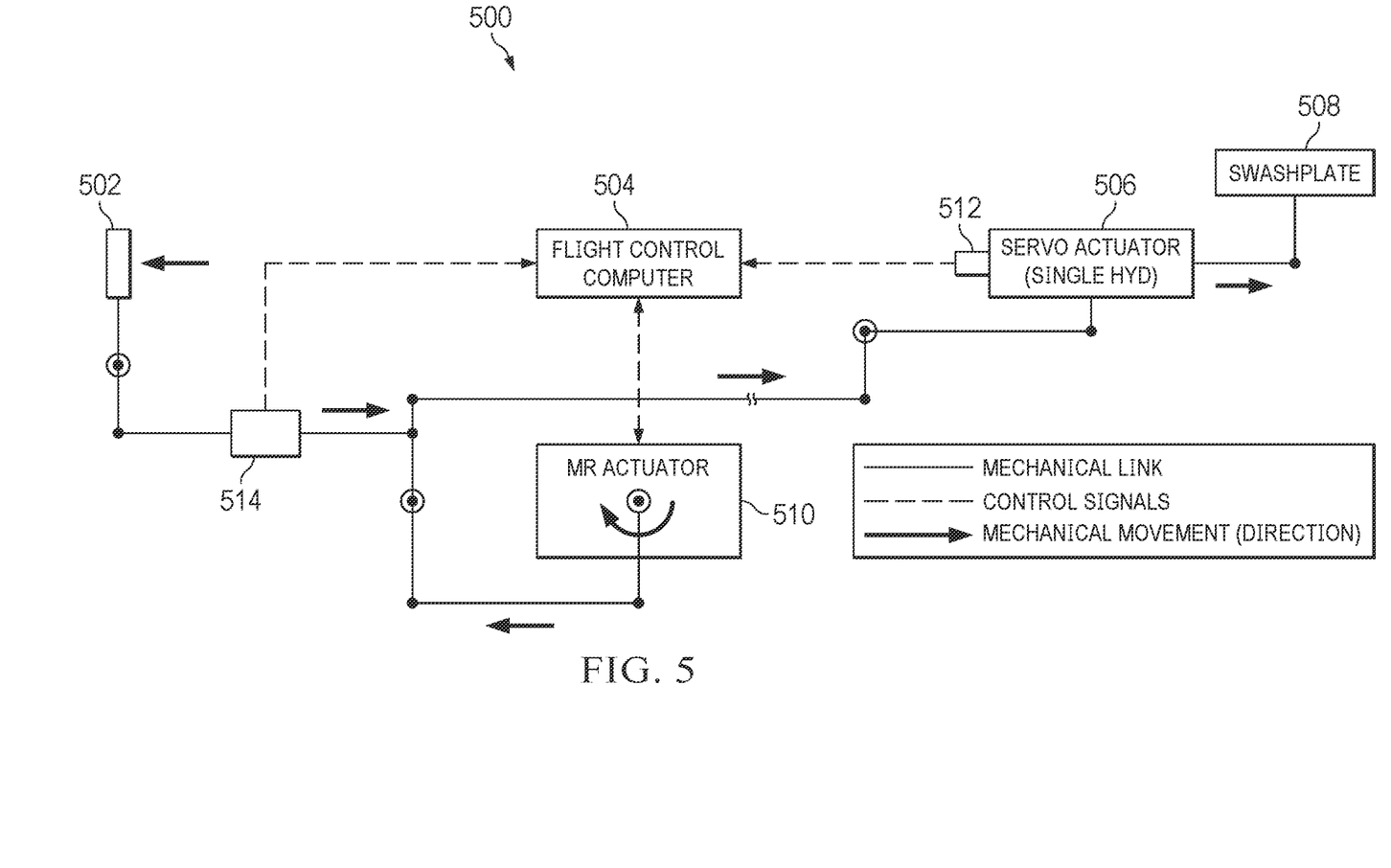
FIG. 5 illustrates an example schematic diagram of a single hydraulic system with parallel MR actuator for boosting pilot flight control input in a rotorcraft according to features of embodiments described herein.

FIG. 5 illustrates a schematic diagram of an example single hydraulic system 500 with MR actuator for boosting pilot flight control input in a rotorcraft according to features of embodiments described herein. As will be described in greater detail below, in accordance with features of embodiments provided herein, an MR actuator is provided in parallel to a single hydraulic actuator to provide both autopilot/trim functions and alternatively to provide pilot force assistance in the event of a hydraulics system or boost actuator failure. In one example embodiment, when the hydraulic boost system is "on" the MR actuators may be used to provide autopilot and/or trim functions as described above. In contrast, when the hydraulic boost system is "off" (or has failed), a flight control computer automatically disengages autopilot and causes the MR actuator to operate in force assist mode to reduce the force the pilot is required to exert to move the pilot input and safely land the rotorcraft in full compliance with 14 CFR 27.141 and 14 CFR 27.695.

Referring now to FIG. 5, system 500 includes a pilot input device 502, which may be, for example, a cyclic and/or collective control stick, mechanically connected via a single hydraulic boost servo actuator 506 to a swashplate 508 of a rotor system, such as rotor system 120 (FIGS. 1A and 1B).

In accordance with features of embodiments described herein, a flight control computer 504 is provided for providing flight control and other operations. Additionally, an MR actuator 510, which may be implemented using MR device 400 (FIGS. 4A-4F), is provided in parallel to the servo actuator 506 for facilitating autopilot and/or trim control functions in connection with pilot input device 502.

A pressure switch 512 is provided in connection with the single hydraulic servo actuator 506 for indicating whether hydraulic system is operating normally (in which case the pressure switch will indicate a threshold pressure) or has failed (in which case the pressure switch will indicate zero pressure). The pressure sensed by the pressure switch is provided to the flight control computer 504. Additionally, a load cell 514 is provided for detecting an amount of force required to move the pilot input device and providing that information to the flight control computer 504. Upon failure of the hydraulic system and/or the servo actuator 506, as indicated by an increased load detected at the load cell 514 and low to no pressure at the pressure switch 512, the flight control computer will activate the MR actuator to provide force assistance to the pilot input device that the failed hydraulic system is no longer able to provide. In particular embodiments, the load of the MR actuator 510 is converted from functioning as an auto pilot/trim control actuator to functioning as a boost actuator to enable the rotorcraft to be safely landed. For example, an additional magnetic flux may be applied to the MR actuator 510 thereby to increase the torque output of the MR actuator 510 in response to failure of the servo actuator 506.

During autopilot mode operation, the MR actuator 510 reacts against the pilot and loads are low to allow overriding by the pilot. When in boost mode, the MR actuator 510 reacts against aerodynamic and inertial loads of the rotors and control surfaces, therefore the load output is increased significantly. The MR actuator load output increase required between autopilot mode and boost mode is approximately 8× for full boost performance. However following a hydraulic failure, reduced performance at 4× of autopilot mode is acceptable.

Figure 6:
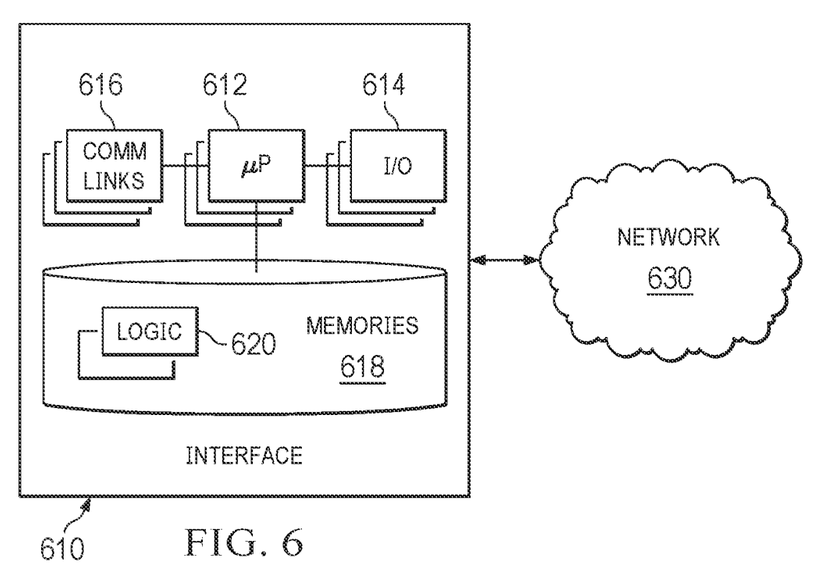
FIG. 6 is a system block diagram of a computer system that may be used to implement features of embodiments described herein.

FIG. 6 illustrates a computer system 610, which may be used to implement flight control computer 504 of FIG. 5. Computer system 610 may include processors 612, input/output (I/O) devices 614, communications links 616, and memory 618. In other embodiments, computer system 610 may include more, fewer, or other components. Computer system 610 may be operable to perform one or more operations of various embodiments. Although the embodiment shown provides one example of computer system 610 that may be used with other embodiments, such other embodiments may utilize computers other than computer system 610. Additionally, embodiments may also employ multiple computer systems 610 or other computers networked together in one or more public and/or private computer networks. Such as one or more networks 630. Computer system 610 may exist wholly or partially onboard the aircraft, off-board the aircraft (e.g., in a ground station), or a combination of the two.

Processors 612 represent devices operable to execute logic contained within a medium. Examples of processor 612 include one or more microprocessors, one or more applications, and/or other logic. Computer system 610 may include one or multiple processors 612. Input/output devices 614 may include any device or interface operable to enable communication between computer system 610 and external components, including communication with a user or another system. Example input/output devices 614 may include, but are not limited to, a mouse, keyboard, display, and printer.

Network interfaces 616 are operable to facilitate communication between computer system 610 and another element of a network, such as other computer systems 610. Network interfaces 616 may connect to any number and combination of wireline and/or wireless networks suitable for data transmission, including transmission of communications. Network interfaces 616 may, for example, communicate audio and/or video signals, messages, internet protocol packets, frame relay frames, asynchronous transfer mode cells, and/or other suitable data between network addresses. Network interfaces 616 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 618 represents any suitable storage mechanism and may store any data for use by computer system 610. Memory 618 may comprise one or more tangible, computer readable, and/or computer-executable storage medium. Examples of memory 618 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 618 stores logic 620. Logic facilitates operation of computer system 610. Logic 620 may include hardware, Software, and/or other logic. Logic 620 may be encoded in one or more tangible, non-transitory media and may perform operations when executed by a computer. Logic 620 may include a computer program, Software, computer executable instructions, and/or instructions capable of being executed by computer system 610. Example logic 620 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 620 may also be embedded within any other suitable medium without departing from the scope of the invention.

Various communications between computer 610 and other computers (not shown in FIG. 6) may occur across a network, such as network 630. Network 630 may represent any number and combination of wireline and/or wireless networks suitable for data transmission. Network 630 may, for example, communicate internet protocol packets, frame relay frames, asynchronous transfer mode cells, and/or other Suitable data between network addresses. Network 630 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other Suitable communication links; or any combination of the preceding. Although the illustrated embodiment shows one network 630, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

Example 1 provides an aircraft comprising a fuselage; a rotor system connected to the fuselage and comprising at least one rotor blade; a pilot input device; a single hydraulic servo actuator in mechanical communication with the pilot input device and the rotor system for providing force assistance in connection with the pilot input device; and a magnetorheological (MR) actuator in mechanical communication with the pilot input device and the rotor system for providing auto pilot assistance in connection with the pilot input device; wherein subsequent to detection of a failure of the single hydraulic servo actuator, the MR actuator is caused to provide force assistance to the pilot input device.

Example 2 provides the aircraft of example 1, further comprising a flight control computer connected to receive pressure data from the single hydraulic servo actuator indicative of an operational status of the single hydraulic servo actuator.

Example 3 provides the aircraft of example 2, further comprising a load cell configured to provide to the flight control computer information regarding a load required to be applied to the pilot input device to move the pilot input device.

Example 4 provides the aircraft of example 2, wherein the flight control computer controls an operation of the MR actuator.

Example 5 provides the aircraft of example 2, wherein the MR actuator comprises MR fluid comprising ferromagnetic particles dispersed in a carrier fluid.

Example 6 provides the aircraft of example 5, wherein the flight control computer causes an increased magnetic flux to be applied to the MR fluid of the MR actuator to increase a torque output of the MR actuator subsequent to the detection of the failure of the single hydraulic servo actuator.

Example 7 provides the aircraft of example 1, wherein subsequent to detection of the failure of the single hydraulic servo actuator, the MR actuator is caused to cease to provide auto pilot assistance in connection with the pilot input device.

Example 8 provides a system comprising a pilot input device for controlling operation of a rotor system comprising at least one rotor blade; a single hydraulic servo actuator in mechanical communication with the pilot input device and the rotor system for providing force assistance in connection with the pilot input device; a magnetorheological (MR) actuator in mechanical communication with the pilot input device and the rotor system for providing auto pilot assistance in connection with the pilot input device; and a flight control computer for detecting a failure of the single hydraulic servo actuator and subsequent to the detection causing the MR actuator to provide force assistance to the pilot input device.

Example 9 provides the system of example 8, further comprising a pressure switch associated with the single hydraulic servo actuator for indicating a pressure of the single hydraulic servo actuator to the flight control computer.

Example 10 provides the system of example 9, wherein, when the pressure indicated by the pressure switch is zero, the single hydraulic servo actuator is determined to have failed.

Example 11 provides the system of example 8, further comprising a load cell for indicating to the flight control computer a load required to be applied to the pilot input device to move the pilot input device.

Example 12 provides the system of example 11, wherein, when the load indicated by the load cell exceeds a threshold value, the single hydraulic servo actuator is determined to have failed.

Example 13 provides the system of example 8, wherein the MR actuator comprises an MR fluid device including first and second bodies and MR fluid disposed between the first and second bodies, wherein the MR fluid comprises ferromagnetic particles suspended in a carrier fluid.

Example 14 provides the system of example 13, wherein movement between the first and second bodies is more restricted when MR fluid device a first magnetic flux than when the MR fluid device is subject to a second magnetic flux smaller than the first magnetic flux.

Example 15 provides the system of example 8, wherein the flight control computer causes an increased magnetic flux to be applied to MR fluid within the MR actuator to increase a torque output of the MR actuator subsequent to the detection of the failure of the single hydraulic servo actuator.

Example 16 provides the system of example 8, wherein subsequent to detection of the failure of the single hydraulic servo actuator, the MR actuator is caused to cease to provide auto pilot assistance in connection with the pilot input device.

Example 17 provides a method of boosting pilot flight control input in a rotorcraft including a pilot input device for controlling operation of a rotor system comprising at least one rotor blade, the method comprising providing a single hydraulic servo actuator in mechanical communication with the pilot input device and the rotor system for providing force assistance in connection with the pilot input device; providing a magnetorheological (MR) actuator in mechanical communication with the pilot input device and the rotor system for providing auto pilot assistance in connection with the pilot input device; and detecting a failure of the single hydraulic servo actuator and subsequent to the detection causing the MR actuator to provide force assistance to the pilot input device.

Example 18 provides the method of example 17, wherein the detecting further comprises providing a pressure switch associated with the single hydraulic servo actuator for indicating a pressure of the single hydraulic servo actuator to the flight control computer, wherein, when the pressure indicated by the pressure switch is zero, the single hydraulic servo actuator is determined to have failed.

Example 19 provides the method of example 18, wherein the detecting further comprises providing a load cell for indicating to the flight control computer a load required to be applied to the pilot input device to move the pilot input device, wherein when the load indicated by the load cell exceeds a threshold value, the single hydraulic servo actuator is determined to have failed.

Example 20 provides the method of example 18, further comprising, subsequent to detection of the failure of the single hydraulic servo actuator, causing the MR actuator to cease to provide auto pilot assistance in connection with the pilot input device.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=RI+k*(Ru−RI), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An aircraft comprising:
   a fuselage;
   a rotor system connected to the fuselage and comprising at least one rotor blade;
   a pilot input device;
   a single hydraulic servo actuator in mechanical communication with the pilot input device and the rotor system for providing force assistance in connection with the pilot input device; and
   a magnetorheological (MR) actuator in mechanical communication with the pilot input device and the rotor system for providing auto pilot assistance in connection with the pilot input device;
   wherein subsequent to detection of a failure of the single hydraulic servo actuator, the MR actuator is caused to provide force assistance to the pilot input device.

2. The aircraft of claim 1, further comprising a flight control computer connected to receive pressure data from the single hydraulic servo actuator indicative of an operational status of the single hydraulic servo actuator.

3. The aircraft of claim 2, further comprising a load cell configured to provide to the flight control computer information regarding a load required to be applied to the pilot input device to move the pilot input device.

4. The aircraft of claim 2, wherein the flight control computer controls an operation of the MR actuator.

5. The aircraft of claim 2, wherein the MR actuator comprises MR fluid comprising ferromagnetic particles dispersed in a carrier fluid.

6. The aircraft of claim 5, wherein the flight control computer causes an increased magnetic flux to be applied to the MR fluid of the MR actuator to increase a torque output of the MR actuator subsequent to the detection of the failure of the single hydraulic servo actuator.

7. The aircraft of claim 1, wherein subsequent to detection of the failure of the single hydraulic servo actuator, the MR actuator is caused to cease to provide auto pilot assistance in connection with the pilot input device.

8. A system comprising:
   a pilot input device for controlling operation of a rotor system comprising at least one rotor blade;
   a single hydraulic servo actuator in mechanical communication with the pilot input device and the rotor system for providing force assistance in connection with the pilot input device;
   a magnetorheological (MR) actuator in mechanical communication with the pilot input device and the rotor system for providing auto pilot assistance in connection with the pilot input device; and
   a flight control computer for detecting a failure of the single hydraulic servo actuator and subsequent to the detection causing the MR actuator to provide force assistance to the pilot input device.

9. The system of claim 8, further comprising a pressure switch associated with the single hydraulic servo actuator for indicating a pressure of the single hydraulic servo actuator to the flight control computer.

10. The system of claim 9, wherein, when the pressure indicated by the pressure switch is zero, the single hydraulic servo actuator is determined to have failed.

11. The system of claim 8, further comprising a load cell for indicating to the flight control computer a load required to be applied to the pilot input device to move the pilot input device.

12. The system of claim 11, wherein, when the load indicated by the load cell exceeds a threshold value, the single hydraulic servo actuator is determined to have failed.

13. The system of claim 8, wherein the MR actuator comprises an MR fluid device including first and second bodies and MR fluid disposed between the first and second bodies, wherein the MR fluid comprises ferromagnetic particles suspended in a carrier fluid.

14. The system of claim 13, wherein movement between the first and second bodies is more restricted when MR fluid device a first magnetic flux than when the MR fluid device is subject to a second magnetic flux smaller than the first magnetic flux.

15. The system of claim 8, wherein the flight control computer causes an increased magnetic flux to be applied to MR fluid within the MR actuator to increase a torque output of the MR actuator subsequent to the detection of the failure of the single hydraulic servo actuator.

16. The system of claim 8, wherein subsequent to detection of the failure of the single hydraulic servo actuator, the MR actuator is caused to cease to provide auto pilot assistance in connection with the pilot input device.

17. A method of boosting pilot flight control input in a rotorcraft including a pilot input device for controlling operation of a rotor system comprising at least one rotor blade, the method comprising:
   providing a single hydraulic servo actuator in mechanical communication with the pilot input device and the rotor system for providing force assistance in connection with the pilot input device;
   providing a magnetorheological (MR) actuator in mechanical communication with the pilot input device and the rotor system for providing auto pilot assistance in connection with the pilot input device; and
   detecting a failure of the single hydraulic servo actuator and subsequent to the detection causing the MR actuator to provide force assistance to the pilot input device.

18. The method of claim 17, wherein the detecting further comprises providing a pressure switch associated with the single hydraulic servo actuator for indicating a pressure of the single hydraulic servo actuator to the flight control computer, wherein, when the pressure indicated by the pressure switch is zero, the single hydraulic servo actuator is determined to have failed.

19. The method of claim 18, wherein the detecting further comprises providing a load cell for indicating to the flight control computer a load required to be applied to the pilot input device to move the pilot input device, wherein when the load indicated by the load cell exceeds a threshold value, the single hydraulic servo actuator is determined to have failed.

20. The method of claim 18, further comprising, subsequent to detection of the failure of the single hydraulic servo actuator, causing the MR actuator to cease to provide auto pilot assistance in connection with the pilot input device.

* * * * *